(12) United States Patent
Dreibholz et al.

(10) Patent No.: US 8,142,332 B2
(45) Date of Patent: Mar. 27, 2012

(54) TRANSMISSION DEVICE AND METHOD FOR OPERATING A VEHICLE DRIVETRAIN

(75) Inventors: Ralf Dreibholz, Meckenbeuren (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 565 days.

(21) Appl. No.: 12/369,282

(22) Filed: Feb. 11, 2009

(65) Prior Publication Data

US 2009/0205454 A1 Aug. 20, 2009

(30) Foreign Application Priority Data

Feb. 19, 2008 (DE) .......................... 10 2008 000 342

(51) Int. Cl.
*F16H 61/26* (2006.01)
(52) U.S. Cl. .......................... 477/127; 477/130; 477/131
(58) Field of Classification Search .................. 477/115, 477/127, 130, 131
See application file for complete search history.

(56) References Cited

U.S. PATENT DOCUMENTS

| 3,831,725 A * | 8/1974 | Schott ...................... 192/48.601 |
| 6,588,292 B2 * | 7/2003 | Yamasaki et al. ............... 74/340 |
| 6,857,513 B2 * | 2/2005 | Tornatore et al. .......... 192/48.91 |
| 6,887,184 B2 * | 5/2005 | Buchanan et al. ............. 477/174 |

* cited by examiner

*Primary Examiner* — Ha D. Ho
(74) *Attorney, Agent, or Firm* — Davis & Bujold, P.L.L.C.

(57) ABSTRACT

A transmission device has at least two change-under-load shift elements with transmission capacities that are varied an actuation device. A method for operating a drive train including transmission and drive engine includes a step that when the transmission is shifted, one of the shift elements, which is engaged in the force flow, is disengaged by the actuation device and the other shift element, which is engaged, is disengaged. The actuation device includes an actuator which applies an actuating force to actuate the shift elements and a coupling device by which the actuator communicates with the shift elements to actuate them, such that an actuating force of the actuator, which is actuating the shift element to be disengaged, can be reduced, while an actuating force of the actuator, which is actuating the shift element to be engaged can simultaneously be increased.

21 Claims, 3 Drawing Sheets

TRANSMISSION DEVICE AND METHOD FOR OPERATING A VEHICLE DRIVETRAIN

This application claims priority from German Patent Application Serial No. 10 2008 000 342.5 filed Feb. 19, 2008.

FIELD OF THE INVENTION

The invention concerns a transmission device with at least two change-under-load shift elements. In addition the invention concerns methods for operating a vehicle drivetrain with a drive engine constructed with the transmission device.

BACKGROUND OF THE INVENTION

To be able to carry out shift operations in vehicles or vehicle drivetrains without interrupting the traction force, in change-under-load transmissions two so-termed change-under-load shift elements are actuated at the same time during shift operations under load. For this purpose, for example electro-mechanical actuating devices are associated with the two change-under-load shift elements, which comprise for each change-under-load shift element a separate actuator or a separate force control element.

If a change-under-load transmission is configured as a dual-clutch transmission, then during driving operation it is always the case that only one of the change-under-load shift elements is actuated or shifted into the force flow of the vehicle's drivetrain, while the other is disengaged from the force flow and is in a load-free operating condition.

Only during a change-under-load shift operation or during the load transfer from the shift element to be disengaged in the direction of the shift element to be engaged, is it necessary, during a certain part of the shift sequence, to actuate both change-under-load shift elements at the same time, since the transmission capacity of the change-under-load shift element to be engaged has to be increased during a traction upshift or a thrust downshift, whereas the transmission capacity of the shift element being disengaged is reduced to the same extent. During traction downshifts or thrust upshifts the procedure just described does not take place until the end of the shift operation.

To avoid compromising comfort during a shift and to prevent unnecessary friction losses in a change-under-load transmission during the later stages of a change-under-load shift operation, at the load transfer time point when the transmission capacity of the shift element to be engaged has a value such that a torque of the drive engine of the vehicle's drivetrain can be transmitted in substantial measure by the shift element being engaged, the transmission capacity of the shift element being disengaged, is reduced to a value at which, so far as possible, only a very small torque can still be transmitted by the shift element being disengaged.

In addition, the electro-mechanical actuation devices provided for actuating the change-under-load shift elements are designed in such manner that in the event of a fault, the two change-under-load shift elements are not simultaneously actuated to such an extent that powerful braking effects occur in the area of driving wheels of the vehicle's drivetrain due to a stressed condition in the area of the change-under-load transmission, which in some circumstances could give rise to situations critical in relation to driving safety.

The design of the electro-mechanical actuation devices with separate actuators for the change-under-load shift elements demands considerable control and regulation effort during changes under load, and entails high production costs.

Thus, the purpose of the present invention is to provide a transmission device with at least two shift elements that can be changed under load and methods for operating such a transmission device, by means of which shifts, in particular changes under load, can be carried out simply and inexpensively.

SUMMARY OF THE INVENTION

The transmission device according to the invention is formed with at least two shift elements that can change under load, whose transmission capacity can be varied by an actuation device. One of the two shift elements, which is engaged in the force flow of the transmission device when a shift command is received, has to be disengaged from the force flow by the actuation device, while the other shift element has to be changed by the actuation device from a disengaged operating condition to an engaged operating condition.

According to the invention the actuation device comprises an actuator by means of which the actuating force needed for actuating the shift elements can be applied. In addition the actuation device is formed with a coupling device by means of which, to actuate the shift elements, the actuator can be brought into active connection with each of the shift elements so that an actuating force of the actuator that actuates the shift element to be disengaged can be reduced, while at the same time an actuating force of the actuator that actuates the shift element to be engaged is increased.

Thus, the transmission device according to the invention is formed with a system which comprises two change-under-load shift elements, which can be acted upon by a single actuator with force in opposite directions, where in this case the term 'in opposite directions' is understood to mean that depending on the way the actuator is actuated, one change-under-load shift element is acted upon by an actuating force directed in the closing direction of the shift element, whereas the other shift element, the one that is to be disengaged, is at the same time acted upon by an actuating force directed in the opening direction of the shift element.

In an advantageous further development of the transmission device according to the invention, in the area of the coupling device the actuator can be brought into active connection with the shift elements in a simple manner by friction-force or positive interlock means, whereas in other embodiments of the transmission device the coupling device can be operated electromagnetically, by an electric motor, hydraulically or pneumatically.

In other advantageous embodiments of the transmission device according to the invention, depending on the application situation at the time, during actuation of the shift elements, elements that have to be moved in rotation and/or translation can be brought into active connection with one another by means of the coupling device.

Alternatively or in addition, in further design forms of the transmission device according to the invention, by means of the coupling device liquid columns, which can be actuated by a hydrostatic pressure, can be brought into active connection with one another in order to couple the shift elements with the actuator or to break the active connection between the actuator and the shift elements, as the case may be.

In further advantageous embodiments of the transmission device according to the invention, in the area of the coupling device any wear of the shift elements caused by their operation, and/or manufacturing tolerances, can be compensated. Wear compensation is provided in particular in the case of change-under-load shift elements made as dry-running friction clutches within the actuation paths between the shift elements and the actuator, by means of which path changes in the control system caused by friction lining abrasion can be compensated and/or dimensions of the components making up the structural groups that form the actuation paths, which differ from one another because of manufacturing tolerances, can be allowed for without additional application expenditure, so as to provide a transmission device with the desired functionality.

An inexpensively and simply managed design of the transmission device according to the invention is characterized in that if the actuation force exerted by the actuator falls below a threshold value, the active connection between the shift elements and the actuator in the area of the coupling device is automatically released, since it is not then necessary either to monitor a transmission operating condition of such type or, correspondingly, to actuate the coupling device if such an operating condition of the transmission device exists.

In advantageous embodiments, in the area of the coupling device the transmission device according to the invention has a separate coupling element for each shift element, and either a separate actuator is associated with each coupling element or more than one coupling element can each be actuated by a common actuator. Of course, a transmission device designed with separate actuators is characterized by a greater degree of freedom in relation to the individual actuation of the various coupling elements compared with embodiments in which more than one coupling element is associated with one actuator. In contrast, however, variants of the transmission device according to the invention in which a plurality of coupling devices can each be actuated by a common actuator are characterized by less need for structural space and lower manufacturing costs than embodiments in which each coupling element is associated with a separate actuator.

By means of the method according to the invention for operating a vehicle drivetrain constructed with the transmission device and a drive engine, when there is a shift command for a traction upshift or a thrust downshift and the coupling device is in a first operating condition in which the shift element that is to be disengaged is coupled with the actuator and the shift element that is to be engaged is decoupled from the actuator, and when the transmission capacity of the shift element to be disengaged corresponds to a required value, the transmission capacity of the shift element to be disengaged is reduced to a limit value which corresponds to the value of the transmission capacity of the shift element to be engaged at the load transfer time and at which at least the torque of the drive engine can be transmitted by means of the shift element to be disengaged or the shift element to be engaged.

Thus, when there is a shift command for a traction upshift or a thrust downshift, the transmission device is correspondingly prepared for carrying out the shift sequence so that the shift process can be carried out with little control and regulation effort and with a high comfort level during the shift.

In an advantageous variant of the method according to the invention, the said limit value of the transmission capacity of the shift element to be disengaged is larger by a safety offset value than the value of the transmission capacity of the shift element to be engaged at the load transfer time, whereby an interruption of the force flow in the transmission device or an unstable variation of the drive output torque at the output of the vehicle's drivetrain, which would compromise driving comfort to an undesired extent, are avoided.

In a further variant of the method according to the invention, the coupling device is changed to a second operating condition in which both the shift element to be disengaged and the shift element to be engaged are actively connected to the actuator by means of the coupling device, in order to be able to carry out the required traction upshift or thrust downshift by simultaneous actuation of the shift element to be disengaged and the shift element to be engaged by means of the one actuator.

In another advantageous variant of the method according to the invention, when the coupling device is in its second operating condition the transmission capacity of the shift element to be disengaged is adjusted essentially to zero and the transmission capacity of the shift element to be engaged is adjusted to a predefined threshold value at which the shift element to be engaged is involved in the force flow and the torque of the drive engine can be transmitted via the shift element to be engaged.

In a further variant of the method according to the invention, torque produced by the drive engine is adjusted to a torque value which is preferably variable as a function of the operating condition, that corresponds to the predefined threshold value of the transmission capacity of the shift element to be engaged, so that the shift can be carried out with the greatest possible comfort.

During another variant of the method according to the invention the coupling device is changed to a third operating condition in which the shift element to be disengaged is separated from the actuator in the area of the coupling device and the shift element to be engaged is actively connected to the actuator by means of the coupling device when the transmission capacity of the shift element to be disengaged is at least approximately zero and the transmission capacity of the shift element to be engaged corresponds at least to the threshold value. In this way erroneous actuation of the shift element to be disengaged by the actuator is avoided in a simple manner when the shift element to be engaged has sufficient transmission capacity and the load transfer is at least nearly completely concluded.

With the alternative method according to the invention for operating a vehicle drivetrain made with the transmission device and with a drive engine, when a traction downshift or a thrust upshift is called for and the transmission capacity of the shift element to be disengaged corresponds to a required value at which the shift element to be disengaged is slipping, and a drive engine torque that corresponds to a nominal value, by means of which in the transmission device a synchronous speed of the target transmission ratio to be engaged by virtue of the shift demand can be set, a change is made from a first operating condition of the coupling device in which the shift element to be disengaged is decoupled from the actuator, to a second operating condition in which both the shift element to be disengaged and the shift element to be engaged are actively connected with the actuator by the coupling device, when in the transmission device a synchronicity of a transmission ratio to be engaged in the transmission device is recognized.

In a variant of the method according to the invention the transmission capacities of the shift elements to be disengaged and to be engaged in the second operating condition of the coupling device are adjusted to the target value necessary for the load to be taken up by the shift element to be engaged, so that when this target value is reached the torque of the drive engine is transferred entirely by the shift element to be engaged and the shift element to be disengaged is essentially free from load, in order to be able to carry out the shift with a high level of comfort.

In a variant of the method according to the invention torque produced by the drive engine is adjusted to a variable torque value that is preferably operating-condition-dependent, which corresponds to the transmission capacity of the shift element to be engaged, whereby the load transfer can be carried out by the shift element to be engaged with little control and regulation effort.

In a further variant of the method according to the invention a coupling device is changed to a third operating condition in which the shift element to be disengaged is separated from the actuator in the area of the coupling device and the shift element to be engaged is actively connected to the actuator by the coupling device when the transmission capacities of the shift elements to be disengaged and engaged correspond to the target values. This ensures, in a simple manner, that the transmission capacity of the shift element to be disengaged after the load take-up by the shift element to be engaged is increased by any erroneous actuator actuation to a value at which torque can be transmitted by the shift element to be disengaged, at which an undesired bracing torque is built up which, in the area of an output of a vehicle drivetrain, results in undesired braking torques which have an adverse influence on driving safety in some circumstances.

In a further alternative method according to the invention for operating a vehicle drivetrain comprising the transmission device and with a drive engine, in the presence of a transmission capacity of the shift element to be disengaged that corresponds to a required value, at which at least the torque of the drive engine can be transmitted by the shift element to be disengaged, and a drive engine torque corresponding to a nominal value at a shift demand for a load-free shift, the coupling device is changed from a first operating condition thereof in which the shift element to be disengaged is coupled with the actuator and the shift element to be engaged is not coupled with the actuator, to a second operating condition in which both the shift element to be disengaged and the shift element to be engaged are actively connected by the coupling device to the actuator, when the transmission capacity of the shift element to be disengaged and the drive torque produced by the drive engine are at least approximately zero.

In a variant of the method according to the invention, if the coupling device is in its second operating condition the transmission capacity of the shift element to be engaged is increased to a target value at which the drive engine torque can be transmitted by the shift element to be engaged, and the drive torque of the drive engine is adjusted to a target value that corresponds to the target value of the transmission capacity of the shift element to be engaged.

BRIEF DESCRIPTION OF THE DRAWINGS

Other advantages and advantageous further developments of the invention emerge from the claims and from the example embodiment whose principle is described with reference to the drawings, which show:

DETAILED DESCRIPTION OF THE PREFERRED EMBODIMENTS

Figure 1:
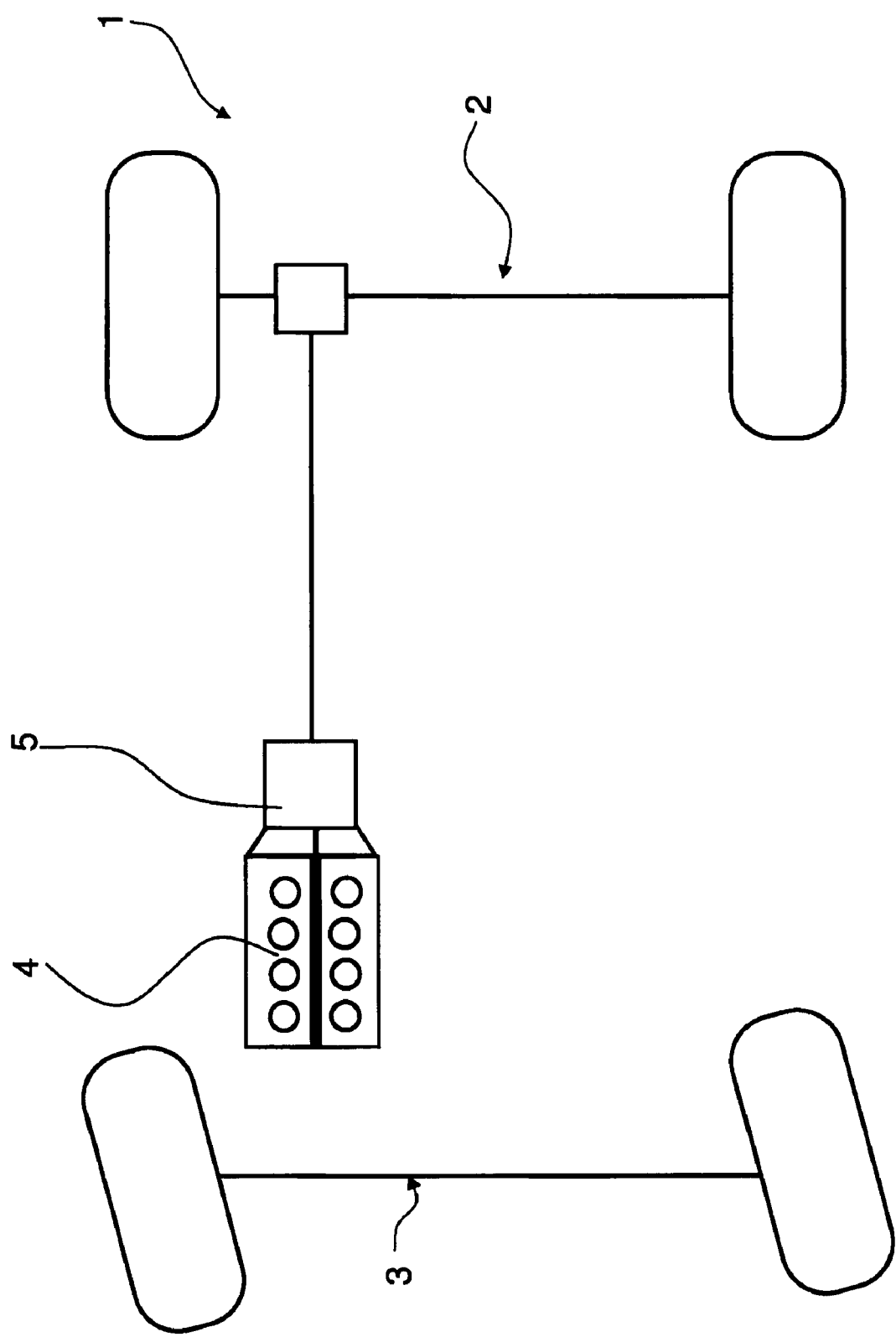
FIG. 1 is a simplified representation of a vehicle made with the transmission device according to the invention.

FIG. 1 shows a vehicle drivetrain 1 with two vehicle axles 2, 3, a drive engine 4, which in this case consists of an internal combustion engine, and a transmission device 5 for producing various transmission ratios for driving forward and in reverse. In the example embodiment shown in FIG. 1 the first vehicle axle 2 of the vehicle drivetrain 1 is the rear axle and the second vehicle axle 3 is the front axle. However, depending on the application or on a desired vehicle concept, it is also possible for the first vehicle axle 2 to be the front axle and the second vehicle axle 3 the rear axle of the vehicle.

Depending on the transmission ratio in place within the transmission device 5 at the time, torque provided by the drive engine 4 can be applied in correspondingly transformed form in the area of the first vehicle axle and transmitted to the first vehicle axle 2 in order to produce a traction or thrust operating mode of the vehicle drivetrain.

Figure 2:
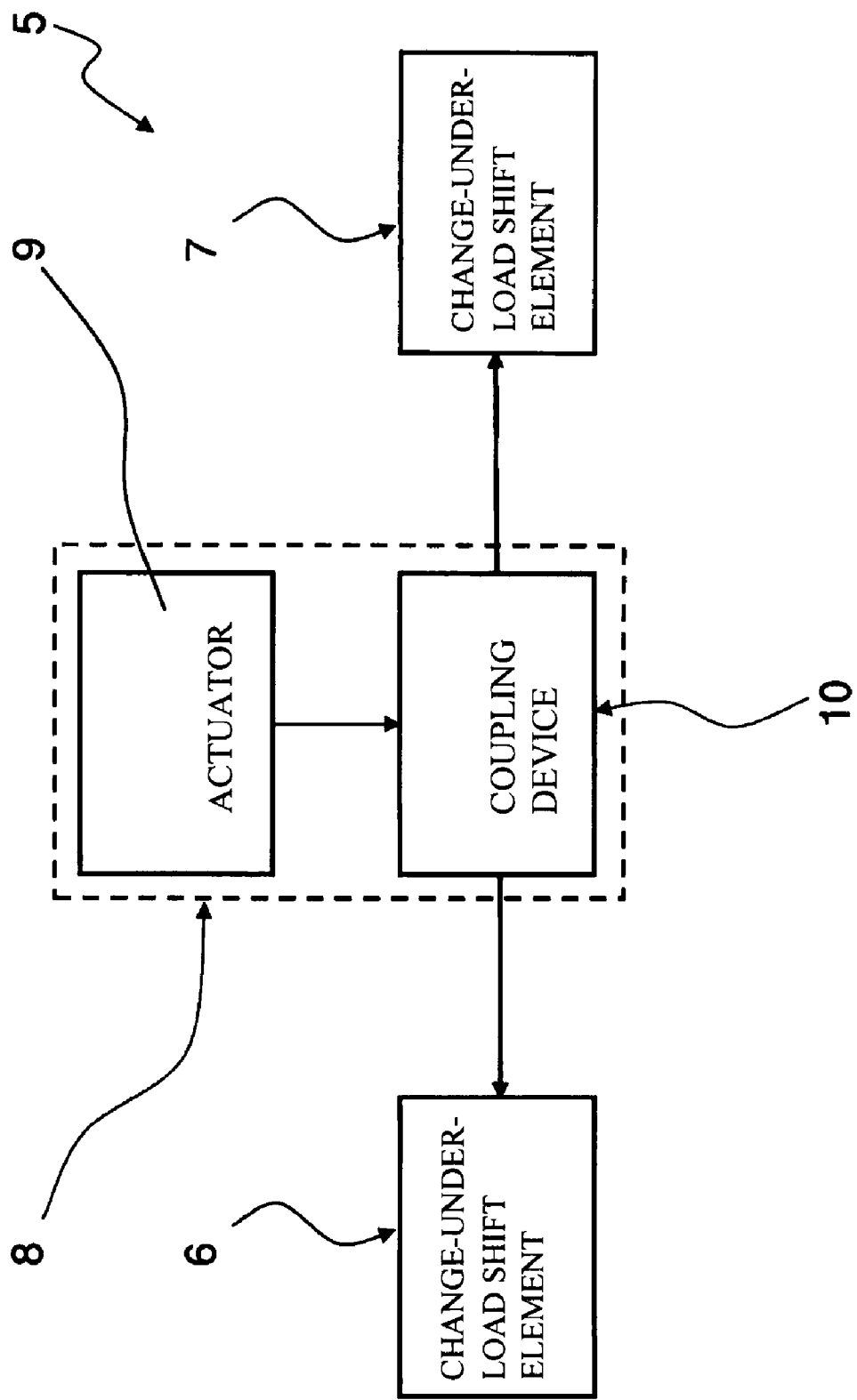
FIG. 2 is part of the transmission device according to the invention, represented as a block circuit diagram.
Figure 3:
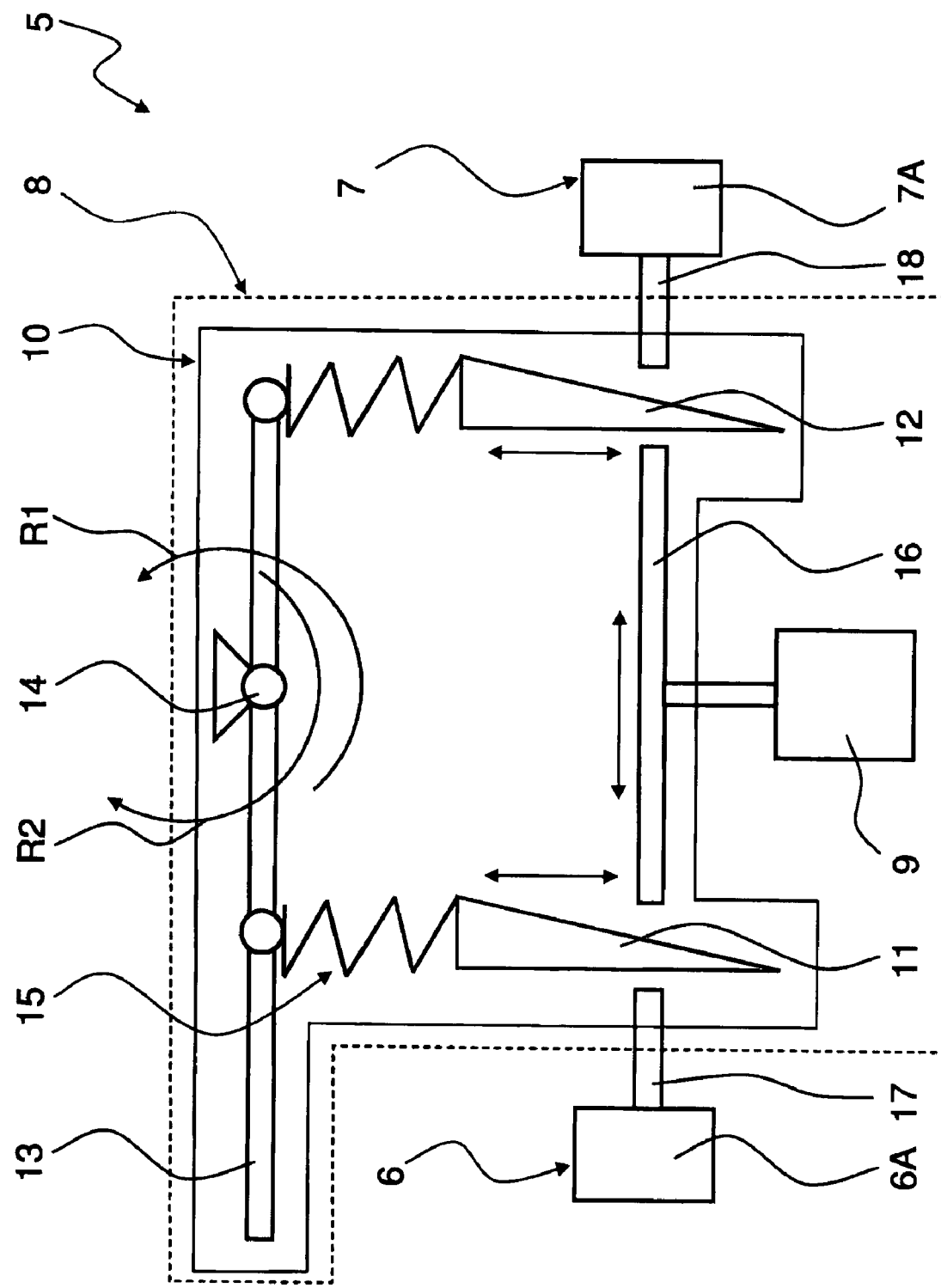
FIG. 3 is as detailed representation of a coupling device of the transmission device according to FIGS. 1 and 2.

Part of the transmission device 5, which in the example embodiment represented in the drawing is made as a dual clutch transmission and, in a manner known per se, comprises two change-under-load shift elements 6, 7 whose transmission capacity can be varied by means of an actuation device 8 shown in more detail in FIGS. 2 and 3, is constructed in the area of the actuation device 8 with an actuator 9 and a coupling device 10.

In this case the coupling device 10 of the actuation device 9 can be actuated between three operating conditions. In a first operating condition, the coupling device 10 forms an active connection only between the shift element 6 and the actuator 9, whereas the shift element 7 is not coupled to the actuator 9. In the second operating condition of the coupling device 8 both shift elements 6 and 7 are actively connected to the actuator 9, while in the third operating condition only shift element 7 is actively connected to the actuator 9.

In the second operating condition of the coupling device 8, in each case one of the two shift elements 6 or 7, which when a shift is called for in the transmission device 5 is engaged in the force flow of the transmission device 5, can be disengaged from the force flow by the actuation device 8, while the other shift element 7 or 6 can be changed by the actuation device 8 from a disengaged operating condition to an engaged operating condition, in order to change the transmission ratio existing at the time in the transmission device in the direction of the target transmission ratio required by the shift.

The actuating forces required for actuating the shift elements 6 and 7 are provided by the actuator 9 of the actuation device 8. The actuator 9 for actuating the shift elements 6 and 7 can be brought by means of the coupling device 10 of the actuation device 8 respectively into active connection with the shift elements 6 and 7, in such manner that an actuating force of the actuator 9 that actuates the shift element 6 or 7 to be disengaged can be reduced in the manner described below, whereas an actuating force of the actuator 9 that actuates the shift element 7 or 6 to be engaged can at the same time be increased. Thus, with the transmission device 5, both of the change-under-load shift elements 6 and 7 can be actuated by the one actuator 9 in any driving conditions of a vehicle constructed with the vehicle drivetrain 1 according to FIG. 1, even during the phase of load transfer between the two shift elements 6 and 7. Hydraulic central disengagement means of the shift elements 6 and 7, not shown in the drawing, are respectively actuated by actuation pistons 6A, 7A of the shift elements 6 and 7 and hydraulic lines.

If a starting process of the vehicle comprising the vehicle drivetrain 1 is to be carried out by means of the shift element 6, the actuator 9, in the present case consisting of an electric motor with spindle drive, is connected to the actuation piston 6A of the shift element 6 by applying an actuating force to a lever 13, so that the actuating force pivots the lever 13 about a bearing point 14 in the direction indicated by the arrow R1.

The pivoting movement of the lever 13 in the direction R1 causes the coupling element 11, in this case made as a self-locking wedge key, to form a form-fitting and frictionally active connection between a rod 16 connected to the actuator 9 and a transfer element 17, which is in turn connected to the actuation piston 6A of the shift element 6. By applying a nominal force or nominal path in the area of the externally controllable actuator 9 the actuation piston 6A of the shift element 6 is moved by the rod 16, this nominal force or path application and hence the transmission capacity of the shift element 6 to be engaged is completely freely adjustable.

To be able to carry out the starting process by means of the shift element 6, the transmission capacity of the shift element 6 has to be adjusted by the actuator 9 as in the case of starting elements in conventional vehicle drivetrain transmission devices.

If a change-under-load shift is called for in the transmission device 5, during which a load transfer is to take place between the two shift elements 6 and 7, and if the shift element 6 is engaged in the force flow while the shift element 7 is disengaged, the coupling device 10 is at first in the first operating condition in which the coupling element 11 associated with shift element 6 is forming the active connection between the rod 16 and the transfer element 17, whereas no active connection is formed by the coupling element 12 associated with the shift element 7 between the rod 16 and a transfer element 18 associated with the actuation piston 7A of the shift element 7.

Starting from the above-described operating condition of the transmission device 5, the transmission capacity of the engaged shift element 6, which is now the shift element 6 to be disengaged for the change-under-load shift, is reduced by the actuator 9 until the shift element 6 is essentially disengaged and the torque applied to the shift element 6 is being transferred without slip.

When the shift element 6 being disengaged has this transmission capacity value, the lever 13 is acted upon by an actuating force which pivots the lever about the bearing point 14 upward in a direction indicated by the arrow R2, whereby the active connection between the rod 16 and the transfer element 18 associated with the shift element 7 is formed while the coupling element 11 associated with the shift element 6 remains in its coupling position. This results from the fact that the spring force exerted by the deflector spring 15 on the coupling element 11, which acts on the coupling element 11 in a direction tending to release the active connection between the rod 16 and the transfer element 17, is not sufficient to overcome the clamping effect between the transfer element 17 and the rod 16.

Next, in the second operating condition of the coupling device 10 a nominal force that actuates the actuation piston 7A of the shift element 7 or a nominal path to be described by the actuator 9 in the area of the spindle drive is set, in order to increase the transfer capacity of the shift element 7 to a predefined value at which the shift element 7 is transmitting the drive torque of the drive engine 4 completely in slipping operation.

Since the shift element 6 is also actively connected to the actuator 9, the actuating force of the actuator 9 acting on the actuation piston 6A is reduced to the same extent that the actuating force of the actuator 9 in the area of the actuation piston 7A of the shift element 7 is increased, so that the shift element 6 being disengaged is completely freed from load and does not slip.

This means that at the time when the nominal force to be exerted by the actuator 9 in the area of the actuation piston 7A of the shift element 7 is applied, this actuation piston 6A of the shift element 6 is essentially free from load. The clamping effect in the area of the coupling element 11 then falls below a limit value and the coupling element 11 is moved or drawn to an operating condition in which the active connection between the rod 16 and the shift element 6 is separated, so that the coupling device has changed to its third operating condition.

Thereafter, the actuator 9 can further increase the transmission capacity of the shift element 7 in a manner known per se by increasing the actuating force exerted by the rod 16 on the actuation piston 7A of the shift element 7, and the said shift element is adjusted to its full transmission capacity in a manner known per se so that the change-under-load is completed. The shift element 6 is essentially completely open so that no torque can any longer be transmitted by it.

Basically, with the transmission device according to the invention, shifts are carried out or completed in which the load is taken up by the shift element being engaged and the shift element being disengaged essentially has a transmission capacity such that no torque can be transmitted by the shift element being disengaged, depending on the application concerned in a manner known per se or conventional manner. In other words the transmission capacity of the shift element being engaged, at the end of the load transfer, at which the shift element is operated with slip or free from slip and transmits the torque of the drive engine completely, is increased by means known per se to its full transmission capacity and/or the torque produced by the drive engine is adjusted to a predefined torque value.

INDEXES

1 Vehicle drivetrain
2, 3 Vehicle axle
4 Drive engine
5 Transmission device
6 Change-under-load shift element
6A Actuation piston
7 Change-under-load shift element
7A Actuation piston
7 Actuation device
8 Actuator
9 Coupling device
11, 12 Coupling element
13 Lever
14 Bearing point
15 Spring
16 Rod
17, 18 Transfer element
R1, R2 Pivoting direction

The invention claimed is:

1. A transmission device (5) with at least two change-under-load shift elements (6, 7), the transmission device comprising:

the at least two shift elements having transmission capacities that are varied by an actuation device (8) such that a first of the at least two shift elements (6, 7), which is engaged in a force flow when a shift is initiated, is disengaged from the force flow by the actuation device (8) and a second of the at least two shift elements (6, 7), which is to be disengaged when the shift is initiated, is engaged in the force flow by the actuation device (8);

the actuation device (8) comprises a coupling device (10) for actively coupling an actuator (9) with the at least two shift elements (6, 7), the actuator (9) applying a variable amount of actuating force on the at least two shift elements (6, 7) to facilitate engagement and disengagement of the at least two shift elements (6, 7); and the actuator (9) applying a variably decreasing amount of actuating force on the first of the at least two shift elements (6, 7) while the actuator (9) simultaneously applying a variably increasing amount of actuating force on the second of the at least two shift elements (6, 7).

2. The transmission device according to claim 1, wherein the coupling device (10) actively couples the actuator (9) with the at least two shift elements (6, 7) via one of a frictional connection or a form-fitting connection.

3. The transmission device according to claim 1, wherein the coupling device (10) is one of operated electromagnetically, hydraulically, pneumatically and by an electric motor.

4. The transmission device according to claim 1, wherein during the active coupling of the at least two shift elements (6, 7), at least one of a rotationally moving element and a translationally moving element actively connect via the coupling device (10).

5. The transmission device according to claim 1, wherein liquid columns, that are actuated by a hydrostatically acting pressure, are actively connected via the coupling device (10).

6. The transmission device according to claim 1, wherein the coupling device (10) compensates for operational wear of the at least two shift elements (6, 7).

7. The transmission device according to claim 1, wherein the coupling device (10) compensates for manufacturing tolerances.

8. The transmission device according to claim 1, wherein when the actuating force of the actuator (9) decreases below a threshold value, the active coupling between the at least two shift elements (6, 7) and the actuator (9) is automatically released with the coupling device (10).

9. The transmission device according to claim 1, wherein the coupling device (10) has a separate coupling element (11, 12) for each of the at least two shift elements (6, 7), and the separate coupling elements (11, 12) are each individually actuated by one of independent actuation elements or a common actuation element (13).

10. A method for operating a vehicle drive train (1), including a drive engine (4) and a transmission device (5) comprising at least two shift elements having transmission capacities that are varied by an actuation device (8) such that a first of the at least two shift elements (6, 7), which is engaged in a force flow when a shift is initiated, is disengaged from the force flow by the actuation device (8) and a second of the at least two shift elements (6, 7), which is to be disengaged when the shift is initiated, is engaged in the force flow by the actuation device (8), and the actuation device (8) comprising a coupling device (10) that actively couples an actuator (9) with the at least two shift elements (6, 7), the actuator (9) applying a variable amount of actuating force on the at least two shift elements (6, 7) to facilitate engagement and disengagement of the at least two shift elements (6, 7), and the actuator (9) applying a variably decreasing amount of actuating force on the first of the at least two shift elements (6, 7) while the actuator (9) simultaneously applying a variably increasing amount of actuating force on the second of the at least two shift elements (6, 7), the method comprising the steps of:

reducing a transmission capacity of the first of the at least two shift elements (6, 7) to a limit value which corresponds to a value of the transmission capacity of the second of the at least two shift elements (6, 7) at a load transfer time-point; and transmitting, at the load transfer time-point, at least a torque from a drive engine (4) by one of the first or the second of the at least two shift elements (6, 7) when each of a traction upshift or a thrust downshift is initiated and the coupling device (10) is in a first operating condition in which the first of the at least two shift elements (6, 7) is coupled to the actuator (9), the second of the at lest two shift elements (6, 7) is not coupled to the actuator (9), and the first of the at least two shift elements (6, 7) has a transmission capacity that corresponds to a required value.

11. The method according to claim 10, further comprising the step of reducing the transmission capacity of the first of the at least two shift elements (6, 7) to a limit value of the transmission capacity of the second of the at least two shift elements (6, 7) that is larger by a safety offset amount at the load transfer time-point.

12. The method according to claim 10, further comprising the step of actuating the coupling device (10) to a second operating condition in which both the first and the second of the at least two shift elements (6, 7) are actively connected to the actuator (9) by the coupling device (10).

13. The method according to claim 12, further comprising the step of adjusting the transmission capacity of the first of the at least two shift elements (6, 7) substantially to zero when the coupling device (10) is in the second operating condition, and adjusting the transmission capacity of the second of the at least two shift elements (6, 7) to a predefined threshold value, at which the second of the at least two shift elements (6, 7) assists in the force flow and the torque of the drive engine (4) is transmitted by the second of the at least two elements (6, 7).

14. The method according to claim 13, further comprising the step of adjusting the torque of the drive engine (4) to a torque value that is varied in an operating-condition-dependent manner, which corresponds to the predefined threshold value of the transmission capacity of the second of the at least two elements (6, 7).

15. The method according to claim 10, further comprising the step of actuating the coupling device (10) to a third operating condition in which, the first of the at least two shift elements (6, 7) is separated from the actuator (9) and the second of the at least two shift elements (6, 7) is actively connected by the coupling device (10) to the actuator (9), when the transmission capacity of the first of the at least two shift elements (6, 7) is at least approximately zero and the transmission capacity of the second of the at least two shift elements (6, 7) corresponds at least to a threshold value.

16. A method for operating a vehicle drivetrain (1) having a drive engine (4) and a transmission device (5) comprising at least two shift elements having transmission capacities that are varied by an actuation device (8) such that a first of the at least two shift elements (6, 7), which is engaged in a force flow when a shift is initiated, is disengaged from the force flow by the actuation device (8) and a second of the at least two shift elements (6, 7), which is to be disengaged when the shift is initiated, is engaged in the force flow by the actuation device (8), and the actuation device (8) comprises a coupling device (10) that actively couples an actuator (9) with the at least two shift elements (6, 7), the actuator (9) applying a variable amount of actuating force on the at least two shift elements (6, 7) to facilitate engagement and disengagement of the at least two shift elements (6, 7), and the actuator (9) applying a variably decreasing amount of actuating force on the first of the at least two shift elements (6, 7) while the actuator simultaneously (9) applying a variably increasing amount of actuating force on the second of the at least two shift elements (6, 7), the method comprising the steps of:

when a traction downshift or a thrust upshift is called for and the shift element (6 or 7) to be disengaged has a transmission capacity that corresponds to a required value at which the shift element (6 or 7) to be disengaged is slipping, and a torque of the drive engine (4) is at a nominal value that corresponds to a set transmission capacity of the shift element (6 or 7) to be disengaged, by which, in the transmission device (5), a synchronous speed of a target transmission ratio by virtue of the shift demand can be set, the coupling device (10) is changed from a first operating condition in which the shift element (6 or 7) to be disengaged is coupled to the actuator (9) and the shift element (7 or 6) to be engaged is not coupled to the actuator (9), to a second operating condition in which both the shift element (6 or 7) to be disengaged and the shift element (7 or 6) to be engaged are actively connected to the actuator (9), when synchronization of a transmission ratio to be engaged in the transmission device (5) is recognized.

17. The method according to claim 16, further comprising the step of adjusting, in the second operating condition of the coupling device (10), the transmission capacities of the first and the second shift elements (6, 7) to target values required for load take-up by the second shift element (6, 7), such that when the target values are reached the torque of the drive engine (4) is transmitted entirely by the second shift element (6, 7) and the first shift element (6, 7) is substantially free from load.

18. The method according to claim 17, further comprising the step of adjusting the torque produced by the drive engine (4) to a torque value that preferably variable in an operating-condition-dependent manner, which corresponds to a predefined threshold value of the transmission capacity of the second shift element (6, 7).

19. The method according to claim 17, further comprising the step of changing the coupling device (10) to a third operating condition in which, in the area of the coupling device (10), the first shift element (6, 7) is separated from the actuator (9) and the second shift element (6, 7) being engaged is actively connected by the coupling device (10) to the actuator (9), when the transmission capacity of the first shift element (6, 7) is at least approximately zero and the transmission capacity of the second shift element (6, 7) corresponds at least to a threshold value.

20. The method according to claim 17, further comprising the step of when the first shift element (6, 7) has a transmission capacity that corresponds to a required value at which at least the torque of the drive engine (4) is transmitted by the first shift element (6, 7), and a nominal value of the torque of the drive engine (4) corresponds to the value of the transmission capacity of the first shift element (6, 7) when a load-free shift is called for, the coupling device (10) is changed from a first operating condition in which the first shift element (6, 7) is coupled to the actuator (9) and the second shift element (6, 7) is actively connected to the actuator (9) by the coupling device (10), when the transmission capacity of the first shift element (6, 7) and the drive torque produced by the drive engine (4) are at least approximately zero.

21. The method according to claim 20, further comprising the step of when the coupling device (10) is in the second operating condition, the transmission capacity of the second shift element (6, 7) being engaged is changed to a target value at which the torque of the drive engine is transmitted by the second shift element (6, 7), and the drive torque of the drive engine (4) is adjusted to a target value that corresponds to the target value of the transmission capacity of the second shift element (6, 7).

* * * * *